US010114718B2

(12) United States Patent
Collins et al.

(10) Patent No.: US 10,114,718 B2
(45) Date of Patent: *Oct. 30, 2018

(54) PREVENTION OF EVENT FLOODING

(71) Applicant: International Business Machines Corporation, Armonk, NY (US)

(72) Inventors: Ann Eleanor Collins, Salisbury (GB); Jenny Jing He, Winchester (GB); Anthony Philip Papageorgiou, Southampton (GB); Andrew Dean Wharmby, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,967

(22) Filed: Jan. 29, 2018

(65) Prior Publication Data

US 2018/0157569 A1   Jun. 7, 2018

Related U.S. Application Data

(63) Continuation of application No. 13/620,785, filed on Sep. 15, 2012, now Pat. No. 9,946,621, which is a continuation of application No. 13/439,714, filed on Apr. 4, 2012, now abandoned.

(30) Foreign Application Priority Data

Apr. 5, 2011  (EP) ...................................... 11161150

(51) Int. Cl.
*G06F 9/54* (2006.01)
*G06F 11/30* (2006.01)
*H04L 12/26* (2006.01)
*H04L 12/24* (2006.01)

(52) U.S. Cl.
CPC ...... *G06F 11/3006* (2013.01); *G06F 11/3072* (2013.01); *H04L 41/147* (2013.01); *H04L 43/0817* (2013.01); *H04L 43/16* (2013.01)

(58) Field of Classification Search
None
See application file for complete search history.

(56) References Cited

U.S. PATENT DOCUMENTS

| 5,944,782 A | 8/1999 | Noble et al. |
| 7,606,149 B2 | 10/2009 | Kumar et al. |
| 2002/0016871 A1 | 2/2002 | Graf |
| 2002/0120736 A1 | 8/2002 | Martin et al. |
| 2005/0015624 A1 | 1/2005 | Ginter et al. |
| 2006/0087409 A1 | 4/2006 | Korzeniowski |
| 2010/0023598 A9 | 1/2010 | Ginter et al. |
| 2010/0274857 A1 | 10/2010 | Garza et al. |

*Primary Examiner* — Shih-Wei Kraft
(74) *Attorney, Agent, or Firm* — William J. Stock; Gregory K. Goshorn; Greg Goshorn, P.C.

(57) ABSTRACT

Techniques for preventing event flooding in an event processing system, comprising: responsive to receiving, by an analysis component, monitored activity data, an analysis component for analyzing the monitored activity data, to determine a potential event; responsive to determining a potential event, an analysis component identifying a set of threshold values and determining whether the potential event has met a threshold value of the set of threshold values; responsive to a positive determination, an analysis component for determining if the met threshold value is an identical threshold value met by a previous potential event; and responsive to a second positive determination, a disregard component for disregarding the potential event.

13 Claims, 6 Drawing Sheets

PREVENTION OF EVENT FLOODING

CROSS-REFERENCES TO RELATED APPLICATIONS

The present application is a continuation and claims the benefit of the filing date of an application entitled, "Prevention of Event Flooding" Ser. No. 13/620,785, filed Sep. 15, 2012, assigned to the assignee of the present application, and herein incorporated by reference; which is a continuation and claims the benefit of the filing date of an application entitled, "Prevention of Event Flooding" Ser. No. 13/439,714, filed Apr. 4, 2012, assigned to the assignee of the present application, and herein incorporated by reference.

FIELD OF THE INVENTION

The claimed subject matter relates generally to the field of event processing. In particular, the present invention relates to techniques for the prevention of event flooding in an event processing system.

BACKGROUND OF THE INVENTION

In an event processing system an 'event' is an identifiable occurrence that has some significance, for example, from a business perspective a business event is a customer placing an order for goods and from a technical perspective, a technical event is the detection of a hardware device malfunctioning.

A significant element of event processing is the task of processing multiple events, whether these are business events or technical events, in order to identify events that are of interest. Event processing software may monitor for events and look for certain event patterns that may be of interest to the user. Once identified, an event may trigger a further action of the event processing system. For example, if a share price reaches/or drops to a particular price, the data processing system may trigger a sale of the share(s).

In an event processing system, the function of identifying events is performed by an event emitter and the generation of an action in response to the emitted event, is performed by a function called an event consumer. There may be many event emitters and event consumers in an event processing system. An event processing system may, for example, comprise a telecommunication network and an event emitter may be a sensor or a probe associated with a piece of hardware. The event consumer may generate an alert in response to the event emitter receiving a signal from the sensor of the probe that there is a fault with the piece of hardware which is being monitored.

It is known, in an event processing system, for an event to occur as a result of a change in a scalar value, for example, a change in the number of active transactions (the scalar value) in the event processing system. An example is as follows:

The number of active transactions is value X
The number of active transactions is determined to be high
The number of active transactions is now determined to be decreasing in number
The number of active transactions has risen above 80% of the predetermined maximum active limit Event processing systems typically provide a means in which a user, of the event processing system, can configure the one or more event emitters to identify particular events of interest. Therefore, logic within the event emitter performs a filter operation in order to identify whether a detected event is an event of interest to the user. If the event is determined to be of interest to the user, the event emitter generates an event for receiving by an event consumer. The event consumer takes some form of action which is appropriate to the event generated by the event emitter.

Prior art US 20100023598, discloses monitoring the performance, security and health of a system in an industrial application. Agents report data to an appliance or server. The appliance stores the data and determines when an alarm condition has occurred. Alarm thresholds may be user defined.

SUMMARY

Viewed from a first aspect, the present invention provides an apparatus for preventing event flooding in an event processing system, the apparatus comprising: responsive to receiving, by an analysis component, monitored activity data, an analysis component for analysing the monitored activity data, to determine a potential event; responsive to determining a potential event, an analysis component identifying a set of threshold values and determining whether the potential event has met a threshold value of the set of threshold values; responsive to a positive determination, an analysis component for determining if the met threshold value is an identical threshold value met by a previous potential event; and responsive to a second positive determination, a disregard component for disregarding the potential event.

Preferably, the present invention provides an apparatus wherein, responsive to determining that the met threshold value is not an identical threshold value met by a previously potential event, a communication component communicating the potential event to a filtering component for determining whether the potential event is an event which is to be communicated to an event consumer.

Preferably, the present invention provides an apparatus wherein an event is a number of changing activities over a time period.

Preferably, the present invention provides an apparatus wherein an event is a number of active transactions for a determined time period.

Preferably, the present invention provides an apparatus wherein an event is a number of active transactions for a determined time period.

Preferably, the present invention provides an apparatus wherein the set of threshold values comprise an ascending set of numerical threshold values for a potential event which is identified as a ascending a numerical measurement scale.

Preferably, the present invention provides an apparatus wherein the set of threshold values comprise a descending set of numerical threshold value for potential events which are identified as a descending a numerical measurement scale.

Preferably, the present invention provides an apparatus wherein the numerical measurement scale is a scalar value.

Viewed from a second aspect, the present invention provides a method for preventing event flooding in an event processing system, the method comprising the steps of: responsive to receiving monitored activity data, analysing the monitored activity data, to determine a potential event; responsive to determining a potential event, identifying a set of threshold values and determining whether the potential event has met a threshold value of the set of threshold values; responsive to a positive determination, determining if the met threshold value is an identical threshold value met by a previous potential event; and responsive Preferably, the present invention provides a method wherein responsive to determining that the met threshold value is not an identical threshold value met by a previously potential event, communicating the potential event, to a filtering component, for determining whether the potential event is an event which is to be communicated to an event consumer to a second positive determination, disregarding the potential event.

Preferably, the present invention provides a method wherein an event is a number of changing activities over a time period.

Preferably, the present invention provides a method wherein an event is a number of active transactions for a determined time period.

Preferably, the present invention provides a method wherein the set of threshold values comprise an ascending set of numerical threshold values for a potential event which is identified as a ascending a numerical measurement scale.

Preferably, the present invention provides a method wherein the set of threshold values comprise a descending set of numerical threshold value for potential events which are identified as a descending a numerical measurement scale.

Preferably, the present invention provides an apparatus wherein the numerical measurement scale is a scalar value.

Viewed from a third aspect, the present invention provides a computer program comprising computer program code to, when loaded into a computer system and executed performs all the steps of the method as described above.

BRIEF DESCRIPTION OF THE DRAWINGS

A preferred embodiment of the present invention will now be described by way of example only, with reference to the accompanying drawings in which.

DETAILED DESCRIPTION OF THE PREFERRED EMBODIMENTS

Figure 1:
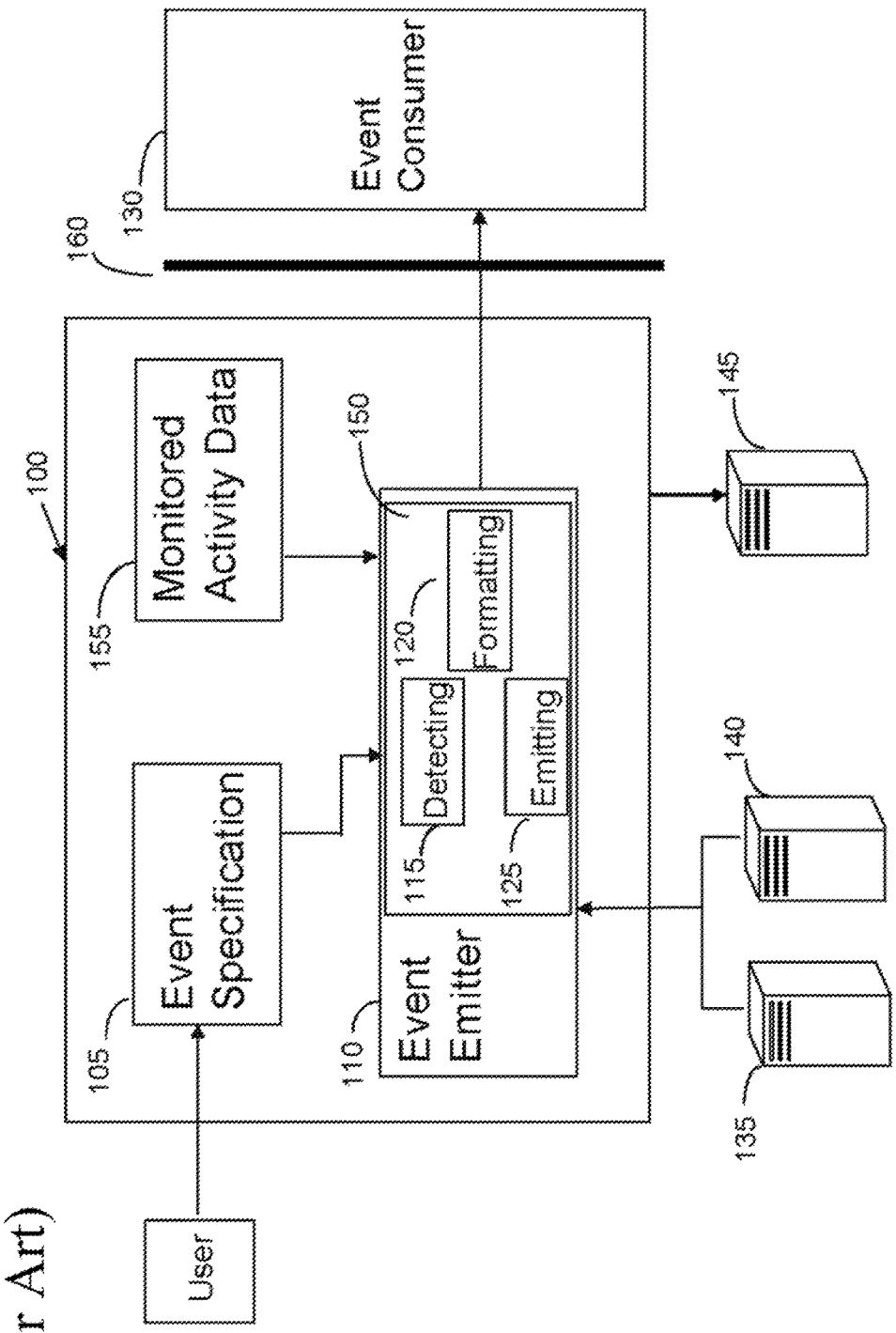
FIG. 1 is a block diagram depicting an event processing system, in accordance with the prior art, and which preferred embodiment of the present invention may be implemented.

AS the Inventors herein have realized, event processing systems typically provide a means in which a user, of the event processing system, can configure the one or more event emitters to identify particular events of interest. Therefore, logic within the event emitter performs a filter operation in order to identify whether a detected event is an event of interest to the user. If the event is determined to be of interest to the user, the event emitter generates an event for receiving by an event consumer. The event consumer takes some form of action which is appropriate to the event generated by the event emitter.

For an event which is classified as a scalar value change event i.e. an event that is only emitted once a scalar value reaches a predetermined value, an event may be generated each time the scalar value changes. However, for rapidly changing or performance-sensitive scalar values this is undesirable for two reasons:

1. Generating an event at each detected change to the scalar value impacts system performance, because each emitter, that has a detected a change to the scalar value, is required to validate the change to the scalar value against the user defined logic in each of the relevant event emitters to determine if an event should be generated.

2. There is a possibility that a number of event emitters generate events at the same time and as a consequence 'flood' the event processing system with events for receiving by event consumers. Event flooding is undesirable because the event emitting system has to incur the cost of formatting and emitting the large number of events and the event consumer which is receiving the events from the event emitter(s) has to incur the cost of processing and reacting to the emitted events. Furthermore, this 'flooding' can have an effect on other systems in the event processing architecture as the event consumer performs actions which affect them.

To solve the first problem, the event emitter can be designed to only emit events at certain points along the scalar value. However, this solution does not address the second problem.

To address the second problem, event flooding can be combated by using a technique called throttling. Throttling is determined as a minimum wait time between events of the same type. However, the use of throttling can lead to inconsistent patterns of events. For example, consider the following event pattern:

1. the number of active transactions has risen above an 80% threshold value;
2. the number of active transactions falls below an 80% threshold value; and
3. the number of active transactions has, again, risen above an 80% threshold value.

If the above sequence of events took place, quickly, in a given timeframe and the technique of throttling was used, the second event may not be emitted, thus having a consequence of the event consumer operating in a logic state of the number of active transactions having risen above an 80% threshold value and thus reacting to an event(s) that is no longer validly present in the event processing system.

FIG. 1 is a block diagram depicting an event processing system 100, in accordance with the prior art, and in which a preferred embodiment of the present invention may be implemented. An event processing system 100 is a system which detects and processes events which have taken place within the event processing system 100 or a data processing system 135, 140 which is in communication with the event processing system 100. An event processing system 100 may be formed of one or more event processing systems 100 or other data processing systems. For example, a telecommunication network may be considered as an event processing system 100 which interfaces with other event processing systems 100 or data processing systems 135, 140 in the telecommunication network. A monitoring system 145 may monitor a sensor which detects whether a network node is operational. If the sensor detects that the network node is no longer operation, the monitoring system sends an alert to an event emitter for processing.

Another type of event processing system 100 is a banking system. Wherein active transactions that take place within the event processing system 100 may generate alerts or the number of transactions that are taking place within the event processing system 100 may generate an alert when the numbers of active transactions reach a certain threshold. A person skilled in the art will realize that an event can be any activity within a system that is of interest to the user. This will depend on the type of event processing system 100, but may comprise such events as, memory usage of a system, bandwidth capacity, the number of calls being received by a call center etc.

A user defines event specifications by defining events of interest in an event specification component 105. An event specification is defined as one or more series of conditions that need to occur before an event is emitted by an event emitter 110, or a pattern of events or conditions which need to occur before an event is generated.

An event emitter 110 is operable on a server application which is operable on a server (not shown). An event emitter 110 comprises a filtering component 150 which receives monitored activity data 155 from monitored activities within the server 135, 140 and/or other parts of the event processing system 100 (telecommunication network, banking system etc) and communicates with the event specification component 105 for receiving information concerning events of interest to the user.

Monitoring systems 145 may be deployed to monitor activities and the monitoring system(s) is in communication with one or more event emitters. The filtering component 150 comprises modules that provide detection, formatting and emitter capabilities. A detecting component 115 interfaces with the event specification component 105 to determine one or more patterns of events or conditions which would trigger an event, what type of data is required to be collected for communicating to an event consumer 130 etc and what type of event is to be emitted i.e. what type of action should take place in response to the emitted event.

Formatting component 120 formats received activity data into a format which can be read and understood by an event consumer 130 i.e. formatting the data into XML or other data formats etc. An emitting component 125 emits the generated event to a 'data bus' 160 for collection by an event consumer 130 for further processing. A person skilled in the art will realize that monitored activity data 155 means data that indicates the operational, processing or transactional status of an event processing system 100 etc.

There may be one or more event emitters 110 operable in the event processing system 100 or one or more event emitters 110 in communication with the event processing system 100. Likewise, there may be one or more event consumers 130 operable in the event processing system 100 or one or more event consumers 130 in communication with the event processing system 100.

In operation, the monitoring system 145 monitors activities from an event processing system 100 or data processing system 135, 145 and communicates data about the activities that are being monitored to the event emitter 110 for processing. The event emitter 110 detects an event and calls to the event specification component 105 to determine if the detected event is an event that the user wishes to be notified about. If, from analysing the event specification, the determination is positive, the event emitter 110 formats an alert and communicates the alert to the data bus 160 for collection by an event consumer 130.

As already explained it is known, in an event processing system 100, for an event to occur as a result of a change in a scalar value, for example, a change in the number of active transactions in the event processing system 100. An example was given as follows:

The number of active transactions is value X
The number of active transactions is determined to be high
The number of active transactions is now determined to be decreasing in number
The number of active transactions has risen above 80% of the predetermined maximum active limit For an event which is classified as a scalar value change event i.e. an event that is only emitted once a scalar value reaches a predetermined threshold value, an event may be generated each time the scalar value changes. For example, the number of active transactions increasing from 10% to 25%—this increase would be considered a change to the scalar value and typically, an event is generated for each change to the scalar value, causing, event flooding which decreases the efficiency performance of the event processing system 100 and any other data processing system which are dependent of the event processing system 100.

Figure 2:
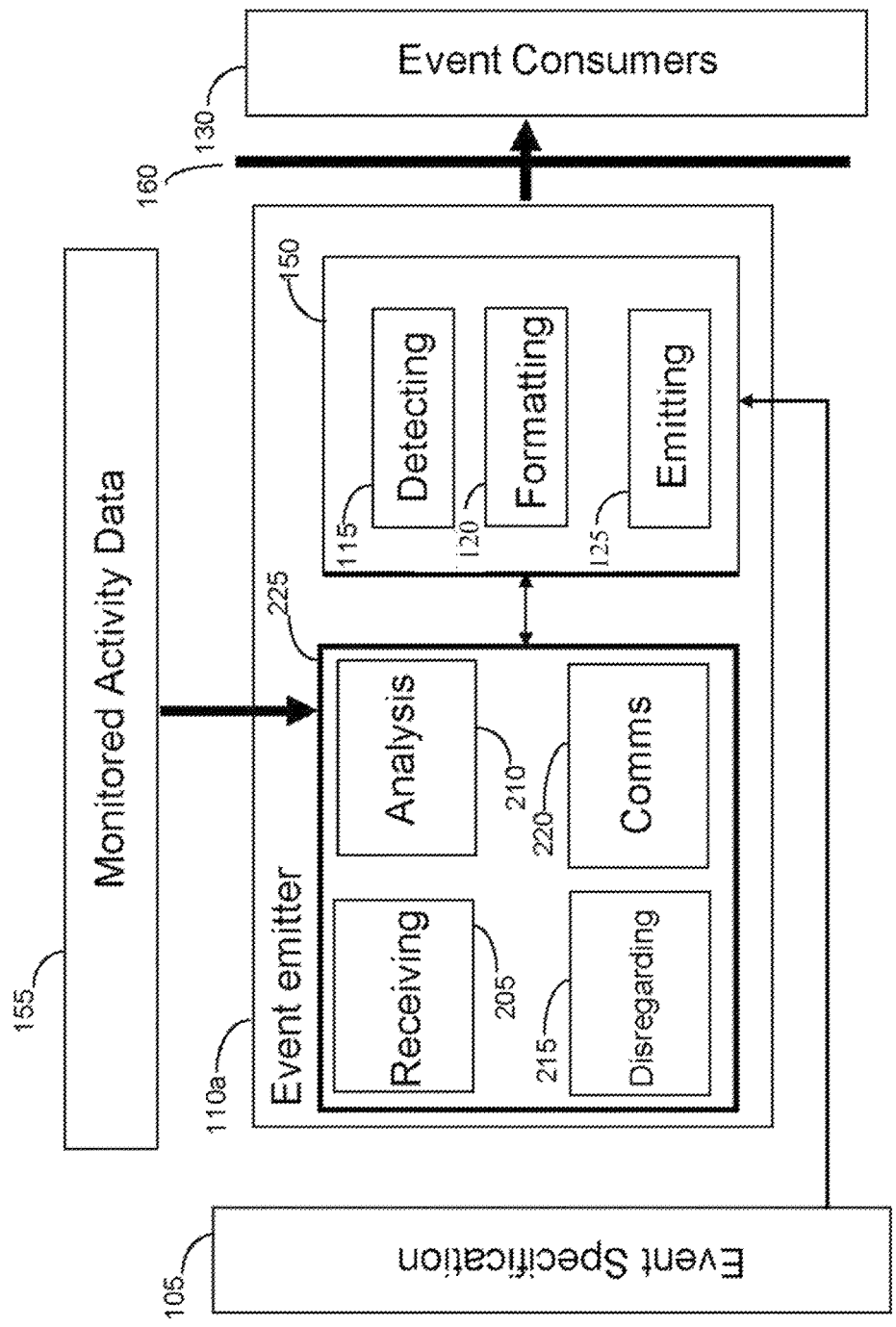
FIG. 2 is a block diagram depicting the new components of a modified event emitter, in accordance with a preferred embodiment of the present invention.

In order to overcome the problem of event flooding due to changes in scalar values, FIG. 2 depicts a modified event emitter 110a. The modified event emitter 110a comprises additional logic embedded in a pre-processing component 225 which performs pre-processing steps to filter out irrelevant changes in the scalar value and thus only generate events which are considered the most relevant.

Once pre-processing is performed, the pre-processing component 225 communicates potential event data to the filter component 150 for further processing in the manner described with reference to FIG. 1.

With reference to FIG. 2, the modified event emitter 110a comprises a new pre-processing component 225 which is in communication with the filtering component 150 of the prior art. The pre-processing component 225 comprises a receiving component 205, an analysis component 210, a disregarding component 215 and a communication component 220 which interfaces and interacts with each other in order to provide the novel and advantageous features of the present invention.

The receiving component 205 communicates received monitored activity data 155 to an analysis component 210 and the analysis component 210, utilizing a set of rules, analyses the data to determine if the received monitored activity data 155 is data that is subject to rising and falling threshold values along a scalar value. For example, the number of active transactions, the percentage of memory usage in the event processing system etc.

If the analysis component 210 determines that the monitored activity data 155 is subject to rising and falling values along a scalar value (such that an event could be generated (a potential event)), the analysis component 210 determines whether the user has assigned any threshold values at one or more points along the scalar value. If the user has assigned threshold values, and the number of/or a percentage of the monitored activity meets a threshold value, a further determination is made to identify whether the met threshold value is the same threshold value as a previous event. If the threshold values are determined to be the same, the potential event is disregarded and no further action is taken.

Thresholds are used in combination with a rule that limit the number of potential events available to any one event emitter. Rules and thresholds are configurable by the user or may be hard coded into an event emitter. Analysis is performed each time the number of active transactions reach a new threshold value i.e. the threshold crossed was not the same as the last threshold crossed by the previous potential event. Each time the number of active transactions decreases or increases this is called a change in the scalar value.

The user may assign any number of threshold values to points along a scalar value. For example if the scalar value is an ascending numerical sequence, such as 10, 20, 30, 40, 50, 60, 70, 80, 90 and 100%, one or more thresholds can be assigned at any numerical point along the scalar value. For example, a threshold value may be assigned to the scalar value of 50, 70 and 90% such that when a threshold is reached an event is generated.

Figure 3:
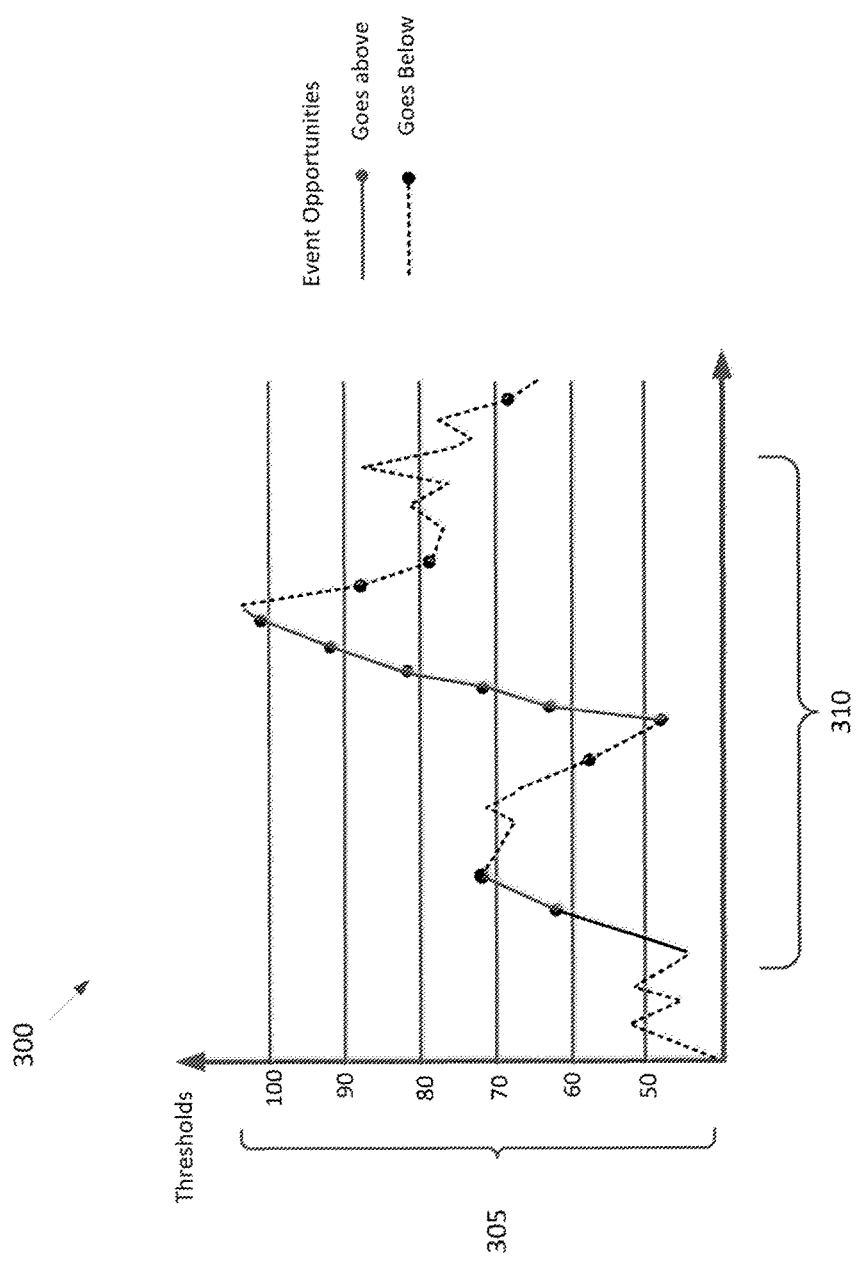
FIG. 3 is a graph which illustrates in graphical form when the modified event emitter generates an event for processing by an event consumer, in accordance with a preferred embodiment of the present invention.

To illustrate this concept further, FIG. 3 is a graph 300 which details which events will be generated when the numbers of active transactions increase across an ascending set of threshold values or decreases across a descending set of threshold values and a corresponding flow chart which maps the operational steps. For example, if the scalar value is ascending, the set of threshold values may be 50, 60, 70, 80, 90 and if the scalar value is decreasing, the set of threshold value may be 90, 80, 70, 60, 50 etc. However, a person skilled in the art will realize that any set of threshold values can be utilized and that the set of threshold values described here are for illustration purposes only.

Illustrated in the graph 300 of FIG. 3, threshold values are defined along the vertical axis 305, namely 50, 60, 70, 80, 90 and 100. The horizontal axis 310 is representative of a nominal time scale. The plots displayed on the graph 300 are indicative on when an event could be generated. Thus a potential event may be generated as it reaches the 50% threshold, the 60% threshold, the 70% threshold, the 80% threshold or the 90% threshold. The term 'potential' is used because after the pre-processing component 225 has completed its analysis, the potential event may be communicated to the filtering component 150 of FIG. 1 for further processing and communicating to an event consumer 130. However, it is not guaranteed that each potential event will be emitted to an event consumer and this will depend on a number of factors considered by the pre-processing component 225 and the filtering component 150.

Working through the data displayed on the graph 300, a first potential event is generated when the number of active transactions reaches the threshold value of 60%. Following the plots of the graph 300, the number of active transactions increase and the next event is generated when the number of active transactions has reached the threshold value of 70%. The number of active transactions then decrease and moves below the 70% threshold value, but a potential event has already been generated for the 70% value, therefore, because a potential event have already been generated for reaching the 70% threshold, no potential event is generated.

The graph illustrates that there is a time period in which the number of active transactions continually hovers above and below the 70% threshold value. For this time period no event is generated, because a potential event has already been generated for reaching the 70% threshold.

The next potential event generated is when the number of active transactions decreases and reaches the 60% threshold value, followed by a potential event being generated as the number of active transactions decreases to the 50% threshold value and then steadily increases again to reach the 60% threshold value in which a potential event is generated.

This is because the last potential event to be generated was when the number of active transactions reached the threshold value of 50%. The number of active transactions on the graph can be seen to reach the maximum threshold value of 100 and as each of the threshold values reached along the scale, a potential event is generated. However, note that when number of active transactions decreases and reaches the 80% threshold value, that the number of active transactions begins to 'hover' between the 80% threshold value and the 70% threshold value. For each of these 'hovering' events or repetition events, no event will be generated until the number of active transactions reaches the 90% threshold value or the 70% threshold value.

Figure 4:
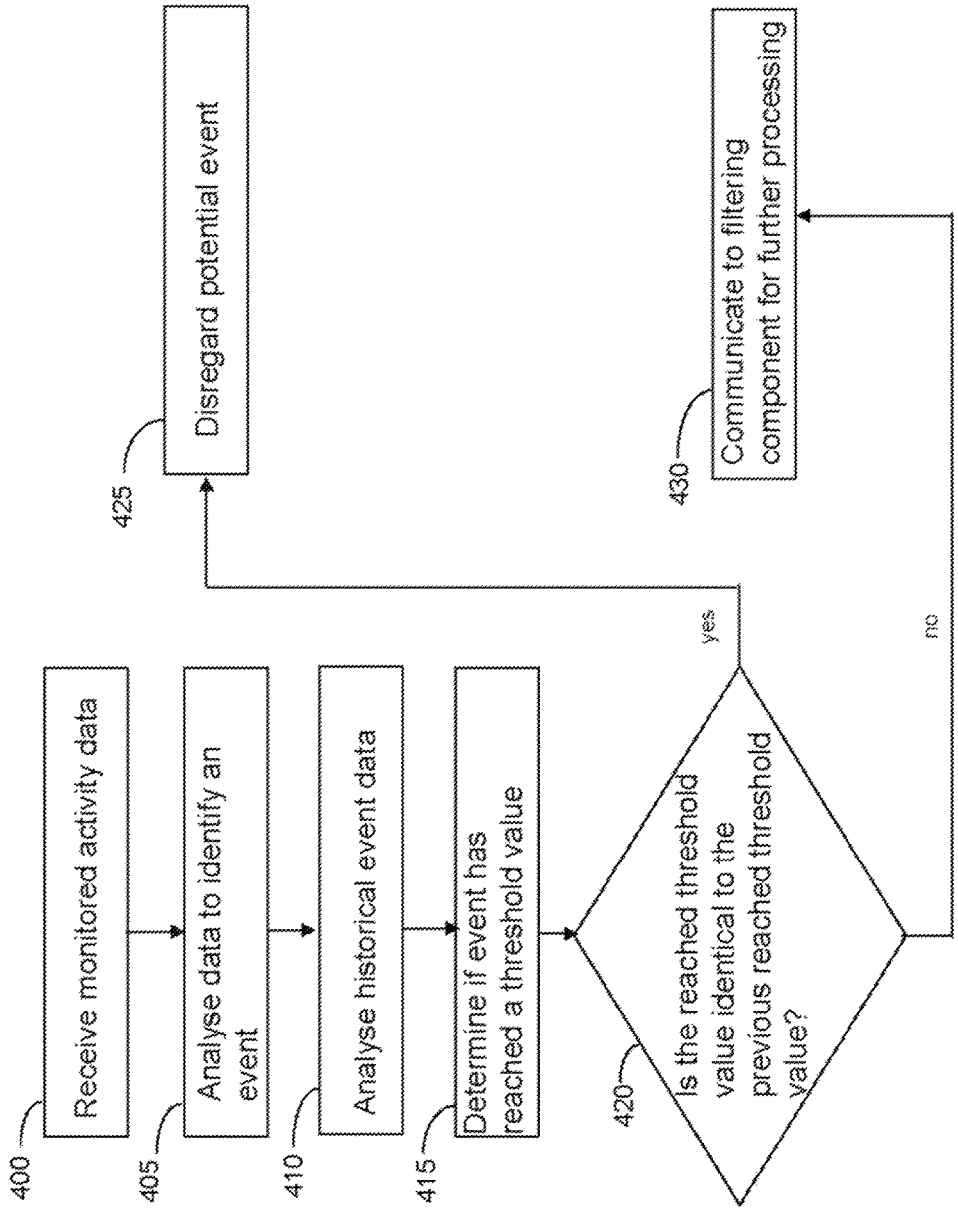
FIG. 4 is a flow diagram illustrating the pre-processing steps of the modified event emitter in order to filter events of non interest, in accordance with a preferred embodiment of the present invention.

Thus, as shown in the graph 300 and with reference to FIG. 4, the pre-processing component analysis received monitored activity data 155 to determine if the data is data that is subject to scalar value changes (steps 400, 405). A potential event (because the event still has to be analysed by the filtering component 150) is generated when the event reaches a defined threshold for the first time in a given time period. This is achieved by the pre-processing component 225 analysing historical data to determine what threshold values was met by the same potential event within a given time period (steps 410 and 415). If the next potential event to be generated is because the number of active transactions has reached the same/identical threshold, then an event is not generated (steps 420 and 425). A potential event is only generated if the number of active transactions reaches a threshold value which is a designated threshold value with a value higher or lower than the first event triggering threshold value (step 430) i.e. the last event did not meet the same threshold value.

Figure 5:
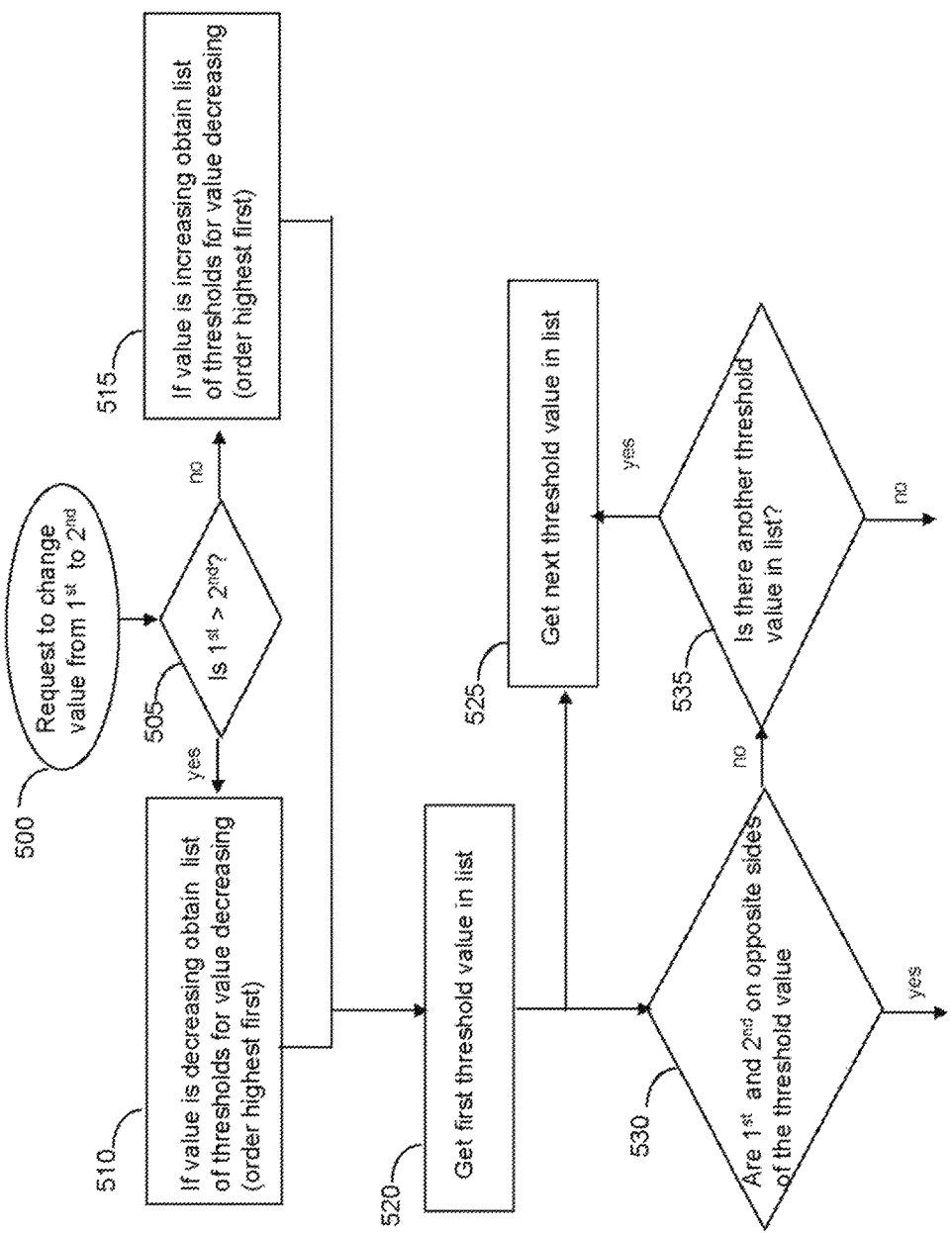
FIGS. 5 AND 6 illustrate a flow chart detailing the operational steps of the modified event emitter in accordance with a preferred embodiment of the present invention.
Figure 6:
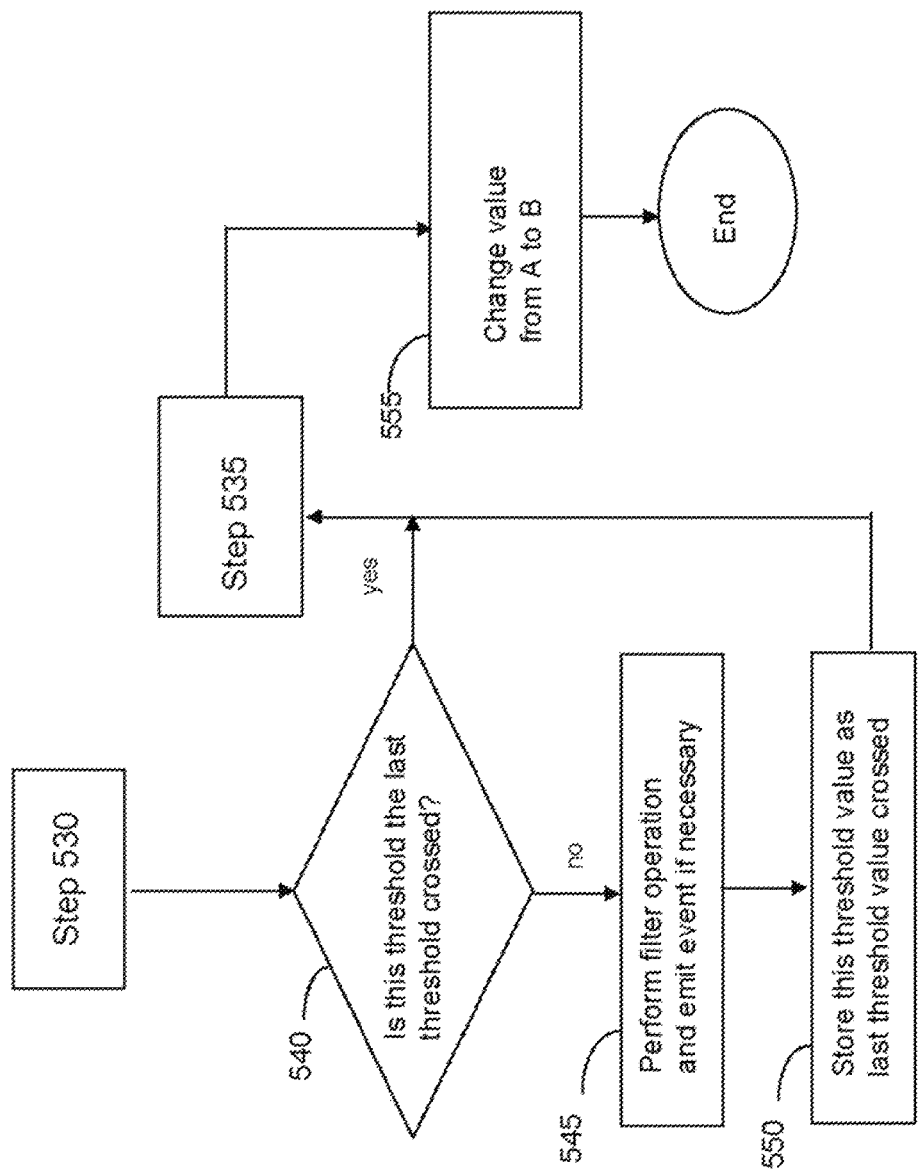

FIGS. 5 and 6 illustrate the technical steps which are implemented in order to achieve the pre-processing component 225 as described above.

Firstly, at step 500, a request is received to change the number of active transactions from a first value to a second value. A determination is made at step 505, to determine whether the transaction value has increased or decreased. If the transaction value has decreased, the analysis component 210 obtains a list of increasing threshold values and if the transaction value is determined as decreasing, the analysis component 210 obtains a list of decreasing threshold values at steps 510 and 515.

At step 520, the first threshold value is obtained from the list and a further determination is made as to whether the first transaction value and the second transaction value are on opposite sides in a scalar value of the obtained threshold value list, at step 530. If the determination is negative, a further determination is made as whether there is another threshold value in the obtained list of threshold values. If the determination is negative, the transaction value is changed from the first value to the second value at steps 535 and 425.

Moving back to step 530, if the determination is positive i.e. the first transaction value and the second transaction values are determined to be on either side of a threshold value i.e. if the first transaction value is 45, the second transaction value is 55, these values are either side of the threshold value 50.

At step 540, a further determination is made as to whether, this current threshold value is the same threshold value that was last reached, if the determination is negative, and the last threshold value was indeed a different threshold value, an additional operation is performed to determine if this change in the transaction value is an event that should be communicated to the filter component 150 for further processing (steps 545 and 550) and the scalar value is updated with the current transaction value at step 555.

If the determination is positive, the event is disregarded and no communication to the filtering component 150 is deemed necessary—the consequence of bypassing step 545 and passing control back to step 535.

Thus, only the potential events that are identified as not having reached a threshold when compared to the previous threshold met by an event, is communicated to the filtering component 150 for further processing. The filtering component 150 will perform look ups in one or more event specifications 105 to determine if the pre-processed event is an event of interest to the user by interfacing with the event specifications. If it is determined the potential event is an event of interest, the filtering component generates an event for communicating to the data bus for receiving by an event consumer 130.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

We claim:

1. An apparatus for preventing event flooding in an event processing system, the apparatus comprising:
    a plurality of processors;
    a non-transitory computer-readable storage medium (CRSM); and
    logic, stored on the CRSM and executed on the plurality of processors, for:
        responsive to receiving monitored activity data, analysing the monitored activity data to identify an event value corresponding to an event;
        responsive to identifying the event value, identifying a set of threshold values and determining whether the event value has met a first threshold value of the set of threshold values;
        responsive to determining that the event value has met the first threshold value, determining if the first threshold value is equal a second threshold value met by a previous event; and
        responsive to determining that the first threshold value is equal the second threshold value, disregarding the event.

2. The apparatus of claim 1 wherein responsive to determining that the first threshold value is not equal the second threshold value, communicating the event to a filtering component for determining whether the event is an event which is to be communicated to an event consumer.

3. The apparatus claim 1, wherein the event is a number of changing activities over a time period.

4. The apparatus of claim 3, wherein the set of threshold values are a scalar numerical measurement scale.

5. The apparatus of claim 1, wherein the event is a number of active transactions for a determined time period.

6. The apparatus of claim 5, wherein the set of threshold values are a scalar numerical measurement scale.

7. The apparatus of claim 1, wherein the set of threshold values comprise an ascending set of numerical threshold values for a potential event which are identified as ascending a numerical measurement scale.

8. The apparatus of claim 1, wherein the set of threshold values comprise a descending set of numerical threshold values for a potential event which are identified as descending a numerical measurement scale.

9. A non-transitory computer-readable storage medium storing program code executed by a plurality of processors to perform a method comprising:
   responsive to receiving monitored activity data, analysing the monitored activity data to identify an event value corresponding to an event;
   responsive to a identifying the event value, identifying a set of threshold values and determining whether the event value has met a first threshold value of the set of threshold values;
   responsive to determining that the event value has met the first threshold value, determining if the first threshold value is equal a second threshold value met by a previous event; and
   responsive to determining that the first threshold value is equal the second threshold value, disregarding the event.

10. The non-transitory computer-readable storage medium of claim 9 wherein responsive to determining that the first threshold value is not equal the second threshold value, communicating the event to a filtering component for determining whether the event is an event which is to be communicated to an event consumer.

11. The non-transitory computer-readable storage medium of claim 9, wherein the event is a number of active transactions for a determined time period.

12. The non-transitory computer-readable storage medium of claim 9, wherein the set of threshold values comprise an ascending set of numerical threshold values for a potential event which are identified as ascending a numerical measurement scale.

13. The non-transitory computer-readable storage medium of claim 9, wherein the set of threshold values comprise a descending set of numerical threshold values for a potential event which are identified as descending a numerical measurement scale.

* * * * *